United States Patent [19]
Goodwin et al.

[11] 4,009,934
[45] Mar. 1, 1977

[54] ELECTRO-OPTIC DISPLAY DEVICES AND METHODS

[75] Inventors: Robert M. Goodwin; Richard T. Klingbiel; Hermann K. Bucher, all of Rochester, N.Y.

[73] Assignee: Eastman Kodak Company, Rochester, N.Y.

[22] Filed: June 28, 1974

[21] Appl. No.: 478,990

Related U.S. Application Data

[63] Continuation-in-part of Ser. No. 432,717, Jan. 11, 1974, abandoned.

[52] U.S. Cl. .......................... 350/160 LC; 252/299
[51] Int. Cl.$^2$ .......................................... G02F 1/13
[58] Field of Search .............. 350/160 LC; 252/299

[56] References Cited
UNITED STATES PATENTS

3,731,986  5/1973  Fergason ................. 350/160 LC X
3,857,629  12/1974  Freiser ........................ 350/160 LC

OTHER PUBLICATIONS

Baur et al., "Controlled Decay of Electrically Induced . . . ," *Applied Physics*, (German), vol. 2, No. 6, pp. 349–350, Dec. 1973.

*Primary Examiner*—John K. Corbin
*Assistant Examiner*—Matthew W. Koren
*Attorney, Agent, or Firm*—H. M. Chamin

[57] ABSTRACT

An electro-optic display is provided which uses a liquid crystalline composition (a) having a positive, zero frequency dielectric anisotropy and (b) exhibiting a dielectric anisotropy inversion with increasing frequency of an applied field. Such a composition is subjected to an electric field of a first audio frequency and then subjected to a field of a second audio frequency of a magnitude sufficient to produce a dielectric anisotropy inversion in said composition. The resultant anisotropy changes allow the molecular orientation of the composition to be altered by the applied field thereby changing the optical properties of the composition.

11 Claims, 6 Drawing Figures

ELECTRO-OPTIC DISPLAY DEVICES AND METHODS

FIELD OF THE INVENTION

This invention relates to electro-optic display devices and their use. More specifically, this invention relates to novel means for modulating light through the use of liquid crystals.

PRIOR ART

Various display devices are known in the art which operate by rotation and orientation of domains or clusters of anisotropic nematic liquid crystal materials. For example, U.S. Pat. No. 3,322,485 describes an electro-optical device comprising a nematic liquid crystal layer having a reflective background and a means to apply an electric field imagewise near the surface of the liquid crystal layer. When a potential is applied across the transparent electrode to create a field, rotation and reorientation of the molecules occur, and the light-transmitting and light-reflecting properties of the nematic medium are altered in the areas exposed to the electric field.

More recently, U.S. Pat. No. 3,499,112, discloses that similar optical effects can be achieved by passing a current through a nematic liquid crystal containing a conductive material, such as an ionic agent, to produce a non-destructive turbulence in the nematic material with resulting light-scattering to a degree dependent upon the magnitude of the current. This optical effect has been labeled "dynamic scattering" and requires current flow, as well as the incorporation of ionic additives, such as surface active agents, to achieve the desired results.

Liquid crystals which are useful in electro-optic devices generally are classified as one of two types: positive or negative materials. This classification is based on the sign of the dielectric anisotropy $\Delta\epsilon$, which is defined as the difference $\epsilon_{\|} - \epsilon_{\perp} = \Delta\epsilon$, where $\epsilon_{\|}$ is the component of dielectric permittivity parallel to the optic axis or to the direction of preferred molecular orientation of the liquid crystal and $\epsilon_{\perp}$ is the perpendicular component of permittivity. Positive materials, therefore, have $\epsilon_{\|} > \epsilon_{\perp}$ and the material orients in an electric field with the molecules preferentially parallel to the field. Positive materials are used in so-called "field-effect" electro-optic devices. The term field-effect has reference to the fact that any optical effects obtained are based solely on the propensity of the liquid crystal to orient within an electric field so that the axis of highest dielectric constant is parallel to the field lines between opposed electrodes. This effect contrasts with dynamic scattering which, as mentioned previously, requires conductivity in the liquid crystal composition. In general, liquid crystals having a negative dielectric anisotropy (i.e., $\epsilon_{\|} < \epsilon_{\perp}$) are best suited for use in dynamic scattering effects inasmuch as the molecules tend to align themselves perpendicular to an applied field.

Whether a material is positive or negative depends on its chemical composition and, therefore, the same material has not subjecting capable of being used for the two types of devices. Furthermore, devices which depend on the reorientation of a liquid crystal by an electric field have generally been limited to orienting in only one direction or the other (namely, parallel or perpendicular to the field). For repetitive reorientations, it has been necessary to permit the material to thermally relax to its original orientation before again exciting the liquid crystal with the electric field. The relaxation process is generally slow, on the order of 100 msec, and is a major limitation to the utilization of liquid crystals.

Accordingly, there exists a continuing need for light-scattering or light-modulating devices which not only are independent of the use of conductive additives, but which exhibit faster response time as well as having lower current flow requirements. Recently, several investigators in the field of liquid crystals have found that many nematic liquid crystals exhibit some form of relaxation of $\epsilon_{\|}$ when subjected to AC fields of increasing frequency. See, for example, paper by A. J. Martin et al, "Proceedings of the Symposium of the Faraday Society," 1971, No. 5, p. 119; W. H. deJeu et al, *Phys. Lett.*, Volume 39A, No. 5, 355 (June, 1972) "Relaxation of the Dielectric Constant and Electrohydrodynamic Instabilities in a Liquid Crystal," W. H. deJeu and Th. W. Lathouwers, "Nematic Phenyl Benzoates in Electric Fields I and II both presented at the Fourth International Liquid Crystal Conference," Kent, Ohio, Aug. 21–25, 1972; and Genova et al, "Proceedings of the Fourth International Liquid Crystal Conference," August, 1972. Although this type of physical property is now well-known for certain liquid crystals, to date, it remains as a mere academic curiosity.

SUMMARY OF THE INVENTION

We have found new methods and means for modulating light using liquid crystalline compositions without the need for conductive additives. The techniques of the present invention are useful in providing light-scattering as well as in providing light valves and high contrast display devices.

In accordance with one embodiment of this invention, there is provided a process and means of obtaining liquid crystal image displays which can be completely controlled by the application of electric fields of differing frequency. Such display devices can be imaged or clarified by the application of an electrical potential. Thus, there is complete positive control in obtaining both the "on" state (imaged) and the "off" state (clarified) without reliance upon the action of conductivity agents or upon thermal relaxation of the molecular orientation.

In accordance with another embodiment of this invention there are provided photoconductor-liquid crystal (PC-LC) elements of greater photographic speed and requiring lower current densities than similar elements using dynamic scattering.

In accordance with a preferred embodiment of this invention new methods and means are provided for obtaining high-contrast image displays and for obtaining colored image displays.

DESCRIPTION OF PREFERRED EMBODIMENTS

We have found that a variety of liquid crystalline compositions can be used as both a positive and negative material to provide new image displays. This ability to change the sign of the dielectric anisotropy of a liquid crystal arises in part from the dielectric loss exhibited by $\epsilon_{\shortparallel}$, the component of dielectric permittivity parallel to the applied field. Thus, useful liquid crystalline compositions for purposes of this invention, include those which (a) have a positive dielectric anisotropy when a field of zero frequency ($f_o$) is applied and (b) exhibit a dielectric loss in $\epsilon_{\shortparallel}$ of such a magnitude as to result in an inversion of the dielectric anisotropy. Preferred materials typically exhibit such an inversion when subjected to electric fields having a frequency in the audio range (e.g., about 10 Hz to about 20 kHz).

A typical suitable liquid crystal such as 4-pentylphenyl 4-(4-pentylbenzoyloxy)-2-chlorobenzoate behaves as a positive material when a low-frequency field is applied. However, upon switching to a higher frequency (i.e., greater than about 5 kHz), this compound behaves as a negative material. It is this property of dielectric anisotropy inversion which allows the molecular orientation of a liquid crystalline material to be changed in accordance with this invention. Thus, altering the frequency of the field applied to a liquid crystal having the specified properties results in molecular reorientation.

The frequencies between which one must alternate in order to obtain an inversion of the dielectric anisotropy will vary from material to material and will also vary with temperature. The temperatures at which the present invention is operative are limited to the mesomorphic temperature range of the liquid crystalline material used. In a preferred embodiment, the temperatures of operation and the mesomorphic temperature range are from about −20° to about 100° C.

Figure 1:
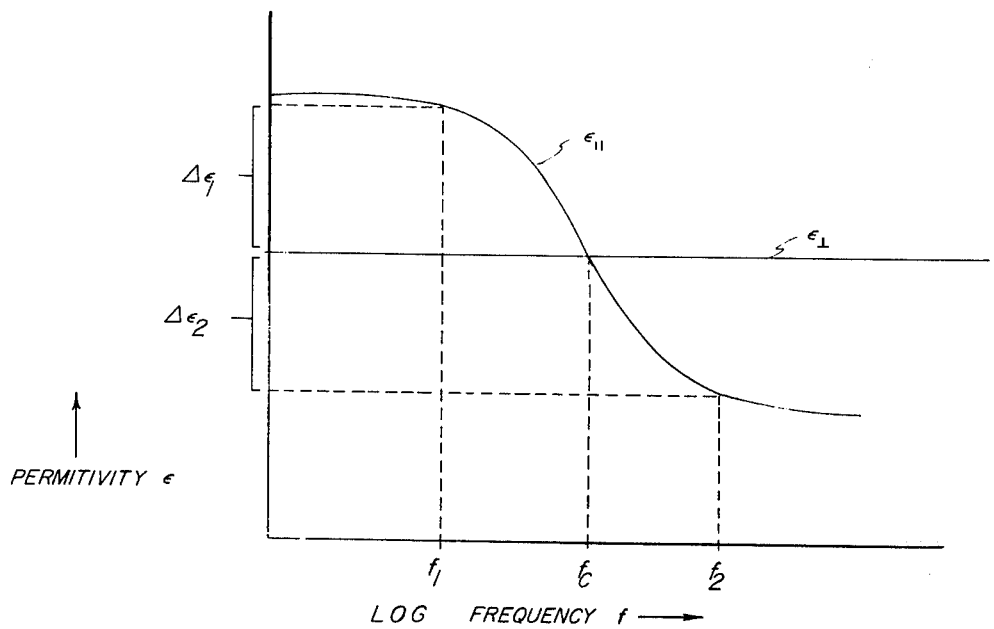
FIG. 1 is a graph showing the variations in dielectric permittivity of a representative liquid crystal composition versus frequency of an applied field.

FIG. 1 illustrates the frequency dependence of the components of the dielectric permittivity at a given constant temperature for a typical liquid crystalline material useful in this invention. In the representative graph of FIG. 1, the perpendicular component of permittivity ($\epsilon_{\perp}$) exhibits little or no change with changing frequency. However, $\epsilon_{\shortparallel}$ exhibits a significant change from a maximum value at frequencies below $f_1$ down to a minimum value above frequency $f_2$. At the crossover frequency ($f_c$) when $\epsilon_{\shortparallel} = \epsilon_{\perp}$ the dielectric anisotropy equals zero ($\Delta\epsilon = 0$). Because orientation of the liquid crystal occurs most readily when $\Delta\epsilon$ is of greatest magnitude, the lowest frequency is best chosen as $f_1$ (or below) because, at these frequencies, $\Delta\epsilon_1$ is the greatest. However, since $\epsilon_{\shortparallel}$ does not increase significantly at frequencies below $f_1$, no real advantage in $\Delta\epsilon_1$ is gained by choosing a frequency much below $f_1$. Similarly, no significant decrease in $\epsilon_{\shortparallel}$ is obtained at frequencies above $f_2$.

Although optimum reorientation is obtained when $\Delta\epsilon$ is the greatest, typically, useful results are obtained when a low frequency is chosen to be from about $0.5f_c$ to $0.1f_c$. Similarly, when choosing the high frequency (to produce an anisotropy inversion) useful results are obtained at frequencies of about $2f_c$ to $10f_c$. In general, compounds particularly useful in this invention are those which have a crossover frequency within the range of about 500 Hz to about 10 kHz, preferably between about 1 kHz to about 5 kHz.

Inasmuch as $f_c$ also changes with temperature at a given frequency of applied field (i.e., $f_c$ increases with increasing temperature), a dielectric anisotropy inversion can also be obtained by alteration of the temperatures of the liquid crystal. However, such a procedure involves expensive heating and cooling apparatus in addition to being a very slow method of operation. Accordingly, the preferred mode of operation is to alter the frequency while maintaining the temperature substantially constant within the range of about −20° C to 100° C.

Figure 2:
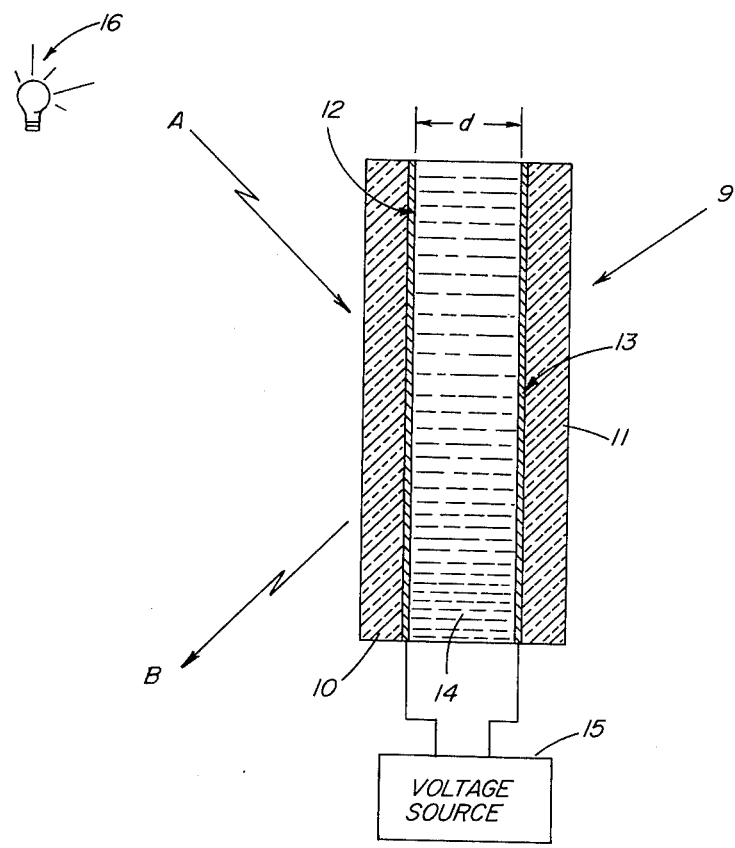
FIG. 2 is a schematic representation of a display device useful in accordance with the present invention.

Turning now to FIG. 2, there is shown a schematic representation of the basic elements of a display device 9 according to this invention. Device 9 comprises two closely spaced transparent cell walls 10 and 11 which are conductive, typically having conductive layers 12 and 13 of, for example, indium oxide on the inner surfaces thereof. The walls 10 and 11 are usually spaced apart a distance d usually in the range of about 2 to about 250 microns. Liquid crystalline material 14 is contained within cell walls 10 and 11.

Liquid crystalline material 14 is subjected to an electric field of sufficient magnitude and of appropriate frequency as to alter and/or positively maintain the orientation of the liquid crystal molecules. The orientation of the molecules of material 14 is not affected until the applied voltages reach a certain minimum threshold value, $V_{th}$. This value depends, of course, on the particular material or combination of materials being used, but is typically about 0.5–50 volts. In order to subject the liquid crystal to an electric field, display device 9 includes a voltage source 15 connected to conductive layers 12 and 13. The potential applied can be d.c. or a.c. and typically has a value between about 3 to 5 times the threshold voltage. For purposes of this invention, source 15 includes means for altering the frequency of the applied field in the audio range. In addition to the capability of changing the frequency of the applied voltage, source 9 can also apply voltages of different frequencies (a) sequentially or (b) simultaneously while changing the amplitude thereof. Any of these alternatives will produce useful results and are part of this invention.

If the frequency of the applied field is rapidly changed back and forth from a value $f_2$ above $f_c$ to a value $f_1$ below $f_c$, the liquid crystal molecules will rapidly reorient from a direction parallel the cell walls (10 and 11) to a direction perpendicular the walls. If switching of the frequency from $f_1$ to $f_2$ is done faster than about 20 changes per second (but less frequent than $f_c$), the eye will only observe the transient condition when the molecules are moving from one orientation to another. In this transient condition the moving molecules scatter incident radiation. Because this condition is brought about by the use of the change in dielectric anisotropy, we refer to this as "dielectric scattering." This type of scattering is entirely distinct from the well-known dynamic scattering which is a conductivity effect and not a field effect. The opaque scattering mode can be clarified by the steady state application of a field of any one frequency. In the clear state, light from source 16 which is not transmitted is reflected at an angle equal to the angle of incidence as shown by arrow B. When the frequency of the applied field is being alternated rapidly between $f_1$ and $f_2$, the cell is in the scattering mode and appears turbid.

The turbid appearance of the nematic liquid crystals resulting from molecular reorientation as described above is not permanent after termination of the applied field. However, as is known from prior techniques for nematic materials, the incorporation of a small amount of a cholesteric material in a nematic liquid crystalline composition results in a longer-lasting turbid appearance. Storage mixtures are described further by Heilmeier and Goldmacher in "A New Electric Field Controlled Reflective Optical Storage Effect in Mixed-Liquid Crystal Systems," *Applied Physics Letters*, pp. 132–3, August, 1968. This storage technique can also be used advantageously in connection with the present invention. For example, the dielectric scattering technique described above can be made to store an image formed by the orientational disruption resulting from the changes in frequency of an applied field. This storage is accomplished by the addition of a minor amount of cholesteric material. The added cholesteric material need not have the dielectric anisotropy properties described above as necessary for the main ingredients of the liquid crystal compositions of this invention.

Figure 3:
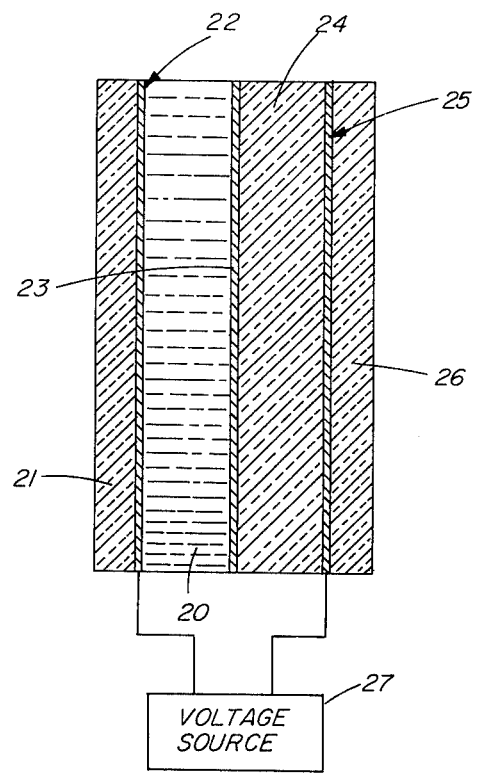
FIG. 3 is a schematic representation of a PC-LC element useful in this invention.

FIG. 3 represents another embodiment of the invention in which a liquid crystalline material 20 is enclosed in a cell formed by transparent wall 21 having conductive coating 22 and a photoconductive element comprising barrier layer 23, photoconductive layer 24, conductive layer 25 and support 26. Conductive layers 22 and 25 are electrically connected to voltage source 27 which is controllable in terms of the amplitude and the frequency of its output. In general, the photoconductor acts essentially as a light-controllable electrode with the liquid crystalline material behaving as described in the other embodiments of this invention.

Figure 4:
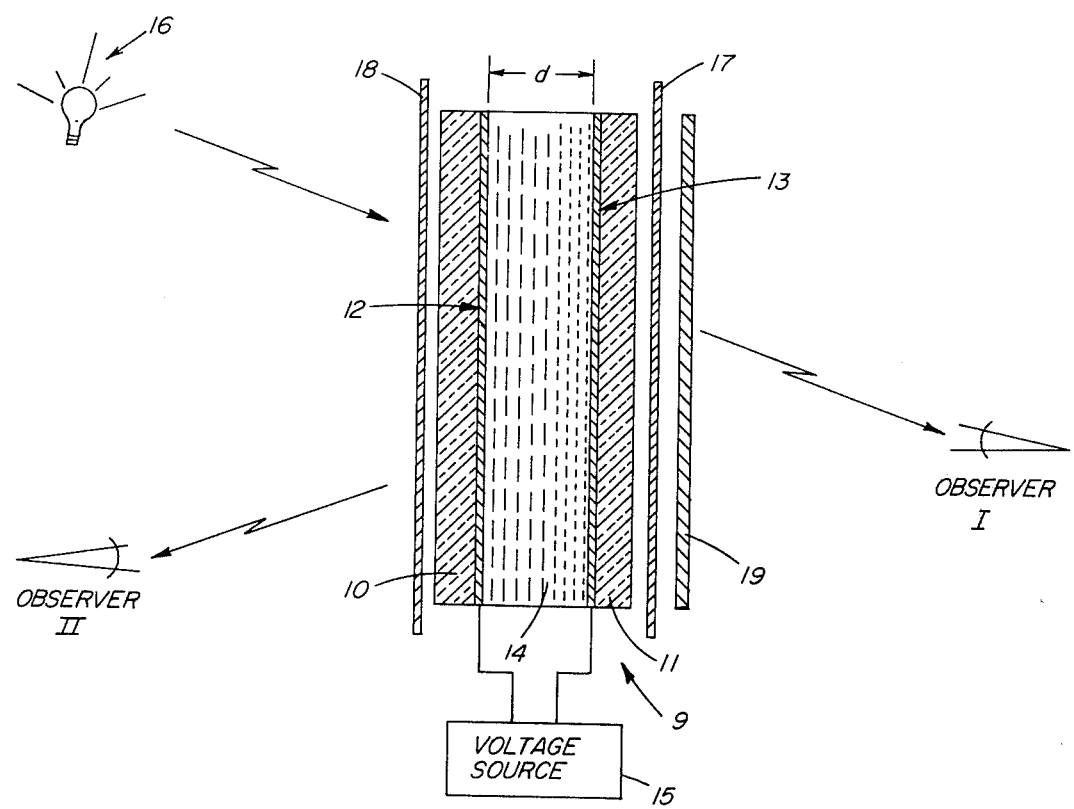
FIG. 4 is a schematic representation of a further embodiment of the invention.

FIG. 4 depicts an especially preferred embodiment of the invention which makes use of a device 9 having cell walls 10 and 11 and other general features as described above in connection with FIG. 2. Device 9 of FIG. 4 has associated with it auxiliary optics in the form of two polarizing filters 17 and 18. In addition, the cell 9 of FIG. 4 optionally has associated with it a reflecting or light-absorbing layer 19. Layer 19 would not be present when this arrangement is used in a transmission mode.

In the arrangement of FIG. 4, the optic axes of the molecules adjacent cell wall 10 are parallel to one another and to wall 10. Similarly, the axes of the molecules adjacent cell wall 11 are also parallel to one another and to wall 11. However, the optic axes of the molecules adjacent cell wall 10 are rotated 90° from the axes of the molecules adjacent wall 11. This results in a quarter turn of the optic axes of the molecules in the bulk of the liquid crystal layer. This configuration (with no applied field) results in a so-called "twisted nematic" texture. This configuration is readily obtained, for example, by rubbing the inner surface of cell walls 10 and 11 and then orienting the direction of rubbing of one wall 90° to the direction of rubbing of the other wall. The polarizing filters 17 and 18 must be oriented with their polarizing axes either parallel or perpendicular to the rubbing direction of their adjacent electrodes. Furthermore, the polarizers can be mutually oriented such that their polarizing axes are either parallel or perpendicular.

With no field applied ("off" state), cell 9 is highly birefringent. If liquid crystal 14 is now subjected to an electric field of frequency below $f_c$ ("on" state), all the molecules will orient with their optic axes parallel to one another but perpendicular to cell walls 10 and 11. This latter condition is known as the "homeotropic nematic texture" and for light incident normal to cell walls 10 or 11, the birefringence has disappeared. In either the "off" or "on" state, the cell content is optically clear and the optical contrast between the "on" and "off" states is produced by the use of polarizing filters 17 and 18 in various arrangements. When oriented in the homeotropic nematic texture, light passes through liquid crystal 14 unaltered and observer I will see no light from source 16 when polarizing filters 17 and 18 are crossed. Similarly, if the cell is used in a reflective mode (i.e., reflective layer 19 is present), observer II will see no reflected image in the case of homeotropic orientation using crossed polarizers 17 and 18.

When liquid crystal material 14 is in the twisted nematic configuration light from source 16 is rotated 90° as it passes through material 14. Thus, the light will pass through polarizing filter 17 and be seen by observer I when cell 9 is used in the transmission mode. In the reflective mode, i.e., when reflective layer 19 is present, light from source 16 will pass through polarizer 17 and be reflected off layer 19 back through cell 9 and through the auxiliary optics (polarizers 17 and 18) and be seen by observer II.

The cell of FIG. 4, together with the auxiliary optics (i.e., crossed polarizers), thus will appear clear when no potential is applied. Now, in order to make the device appear black, one simply applies an electric field of a frequency below $f_c$. At such a frequency, the composition exhibits a positive dielectric anisotropy and thus forms a homeotropic texture which passes light unchanged. However, the crossed polarizers do not pass the light and accordingly, the display device appears black when a field of frequency below $f_c$ is applied.

In order to return the display to a transparent state, one need not rely on thermal relaxation of the molecular orientation. According to this invention, the device which was "driven" to the black appearance can similarly be driven back to the transparent appearance. The return to the transparent state is promptly obtained by the application of an electric field having a frequency above $f_c$ which results in an inversion of the dielectric anisotropy. Liquid crystalline material 14 now behaves as a negative material and under the influence of this field of frequency higher than $f_c$, the molecules turn so that their optic axes are again parallel to the walls. Because the molecules prefer this orientation when no field is applied, the field can be terminated and the liquid crystalline composition 14 will now remain in the twisted nematic texture.

As mentioned previously, useful liquid crystals are those which (a) have a positive, zero frequency dielectric anisotropy and (b) exhibit a dielectric anisotropy inversion with increasing frequency of an applied field within the audio frequency range. Preferred materials from the standpoint of ease of handling, not only have the above properties, but also are mesomorphic within the temperature range of about −20° to about 100° C. It will be appreciated that materials having a mesomorphic range extending beyond 20° to 100° C can be advantageous in combination with other liquid crystals to obtain a mixture that is mesomorphic within the temperature range of choice. Typically useful nematic materials are molecules comprised of a linear chain of at least three aromatic groups preferably phenylene groups, interconnected through a divalent linking group containing an even number of atoms in the "chain." Useful linking groups include such groups as a carbonyloxy group

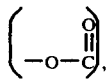

a vinylene group (—CH=CH—), a carbonylimino group

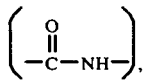

an ethynylene group (—C≡C—), an azomethine group (—CH=N—), an azo group (—N=N—), an azoxy group

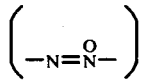

3 n
and other such groups having a doubly bonded atom in or appended to the linking chain. In general, useful nematic liquid crystals are those having the dielectric properties discussed above and having a formula as follows:

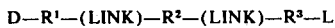

in which (LINK) represents a divalent linking group as discussed above; $R^1$, $R^2$ and $R^3$ each represent an aromatic group and preferably a phenylene group including substituted phenylene having as a substituent a halogen atom (e.g., Cl, F, etc), a cyano group, a methyl group, or a nitro group, preferably with at least one halogen atom or one cyano group being present on at least one of $R^1$, $R^2$ or $R^3$; and D and L represent non-interfering terminal substituents such as (a) a linear or branched chain alkyl group having from 1 to about 18 carbon atoms and typically having 1 to about 12 carbon atoms such as methyl, ethyl, isopropyl, isobutyl, octyl, decyl, dodecyl, pentadecyl, etc, and including the corresponding substituted alkyl groups having small, polar substituents containing no more than 8 atoms (preferably no more than 5 atoms) such as methoxy, ethoxy, cyano, halogen and similar substituents (b) a cyano group, (c) a linear or branched chain alkoxy group having 1 to about 18 carbon atoms and typically having 1 to about 12 carbon atoms such as methoxy, ethoxy, isobutoxy, hexoxy, dodecoxy, etc, and including the corresponding substituted alkoxy groups having small, polar substituents as described above for the alkyl group, (d) an alkylcarbonyloxy group having 1 to about 12 carbon atoms in the alkyl moiety, (e) an alkoxycarbonyloxy group having 1 to about 12 carbon atoms in the alkoxy moiety, (f) a linear or branched chain alkanoyl group having 1 to about 12, and preferably 1 to 8, carbon atoms in the alkyl portion of the group, (g) a halogen atom, (h) a nitro group, (i) a trihalomethyl group or (j) a phenyl group. It is preferred that linking positions on the aromatic groups be located diametrically, such as 1,4-phenylene, 2,6-naphthylene, 9,10-anthrylene, 1,5-anthrylene, 2,6-anthrylene and the like. The most preferred from the standpoint of stability are those nematic compounds as described herein wherein (LINK) represents a carbonyloxy moiety. Particularly useful nematic materials are many of the substituted phenyl p-benzoyloxy-benzoates of the type described in copending VanMeter and Klanderman allowed application, Ser. No. 388,516, filed Aug. 15, 1973, and entitled LIQUID CRYSTALLINE COMPOUNDS AND COMPOSITIONS, now U.S. Pat. No. 3,915,883 granted Oct. 28, 1975. It will be appreciated that the ability of particular liquid crystalline materials to undergo a frequency induced inversion of dielectric anisotropy can be determined conveniently by the procedures discussed herein.

In still a further embodiment of this invention, the liquid crystalline composition comprises a cholesteric material which, as is typical of such materials, has an inherent twist independent from wall-effect enforced orientation as in the case of the twisted nematic texture above. Cholesteric materials have a helical structure. The pitch of the helices give rise to Bragg reflections making the cholesteric material appear colored if the reflections are in the visible image. Thus, if the pitch is comparable to the wavelengths of visible light, the cell contents look colored since 50% of the incident light is wavelength selectively reflected. This color is observed best when all axes of the helices are perpendicular to the cell walls.

The resultant texture when the axes of all the helices are in the same direction perpendicular to the cell walls is referred to as "planar." If the cholesteric material exhibits a dielectric anisotropy inversion with increasing frequency of an applied field, as described above, the cell can be driven from the colored planar cholesteric texture to another texture. By applying a sufficient voltage of a frequency such that $\Delta\epsilon>0$, the electric field destroys the cholesteric texture and the liquid crystal assumes a homeotropic nematic texture as discussed above. When such a condition exists, cell 9 (without polarizing filters 17 and 18) is transparent and appears black when viewed against a black background. That is, if member 19 is a light absorbing layer, observer II will see black in those areas of applied field.

Upon removing the applied field, the cell contents relax back to the characteristic twisted arrangement of cholesteric materials; however, the liquid crystal material is unable to assume the planar texture and remains in a state of opaque appearance. The planar texture is readily brought about by applying another electric field of a frequency such that $\Delta\epsilon<0$. Cholesteric materials with dielectric properties as described offer the possibility to switch rapidly between the planar-cholesteric and the homeotropic-nematic texture. Devices employing the planar-cholesteric to homeotropic-nematic transition are esthetically pleasing, since both states are optically clear. Furthermore, the planar texture allows information to be displayed in color by virtue of the bright reflection characteristic of the cholesteric phase. It is well known that this characteristic color is dependent upon the pitch of the planar texture and is easily selected by material formulation. Good contrast is obtained, furthermore, without requiring auxiliary optical means such as external polarizers. Instead, a simple black or reflecting background is sufficient. These characteristics should be contrasted to those normally available in liquid crystal electro-optical devices. With materials having a constant sign of their dielectric anisotropies, it is only possible to address from a turbid scattering texture to (a) a planar cholesteric texture for materials having a negative anisotropy, or (b) the homeotropic nematic texture for materials having a positive anisotropy.

Particularly useful cholesteric liquid crystalline materials are those which are referred to herein as "chiral nematic" liquid crystals and which have the desired dielectric loss properties discussed above. The chiral nematic compounds exhibit the cholesteric (i.e., helical) mesophase but are not derivatives of cholesterol. These non-steroidal cholesteric compounds have stuctures which are nearly identical to those of nematic compounds, with one important exception. That is, they contain at least one asymmetrically substituted carbon atom as part of an end group. An asymmetrical carbon atom is one which is bonded to four different atoms or groups. If a molecule has such an asymmetric center, the molecule will be non-identical with its mirror image and will, therefore, be optically active. A further general discussion of compounds of this type is contained in "Liquid Crystal Systems for Electro-Optical Storage Effects" by J. A. Casteilano et al in their Final Report of December, 1971, prepared under A. F. Contract No. F33615-70-C-1590, Project No. 7360, incorporated herein by reference.

Among the preferred cholesteric compounds are the chiral nematic compounds formed by the substitution of at least one asymmetrical carbon atom as an end group on a nematic compound which (a) has a positive zero frequency dielectric anisotropy and (b) exhibits a dielectric anisotropy inversion with increasing frequency of an applied field in the audio frequency range as described previously. Typical asymmetrical carbon atom-containing end groups include those having the formula:

wherein $m$ is a positive integer having a value of 0 to 5 and preferably 0 or 1; $R^4$ and $R^5$ are different and represent a member selected from an alkyl group including substituted alkyl, having 1 to about 10 carbon atoms, an alkoxy group having 1 to about 10 carbon atoms, a halogen atom, a cyano group, and a nitro group. The above end groups may also be linked to an $R^1$ or $R^3$ group through an insulating group such as an oxygen atom, a carbonyloxy group or an oxycarbonylvinyl group. Preferred end groups are those of the above formula in which $R^4$ and $R^5$ are different and represent an alkyl group typically having about 1 to 6 carbon atoms. Included among preferred chiral nematic materials are those having Formula I above wherein at least one of D or L is an asymmetrical carbon atom-containing end group as described above.

More particularly, various liquid crystals that are of the type described herein include compounds of the formula:

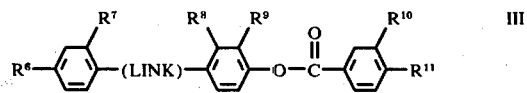

that are fully characterized as set forth in following Table I.

TABLE I

| Compound Number | $R^6$ | $R^7$ | $R^8$ | $R^9$ | $R^{10}$ | $R^{11}$ | (LINK) | Mesomorphic Range °C |
|---|---|---|---|---|---|---|---|---|
| 1 | $OC_8H_{17}$ | — | — | Cl | — | $OC_8H_{17}$ | —OCO | 75–148 |
| 2 | $OC_8H_{17}$ | — | — | Cl | — | $C_5H_{11}$ | —OCO | 71–139 |
| 3 | $C_5H_{11}$ | — | — | Cl | — | $C_5H_{11}$ | —OCO | 67–130 |
| 4 | $C_8H_{17}$ | — | Cl | — | — | —$OCOC_4H_9$ | —OCO | 51–147 |
| 5 | $C_8H_{17}$ | — | Cl | — | Cl | —$OCOC_4H_9$ | —OCO | 43–109 |
| 6 | $C_5H_{11}$ | — | Cl | — | — | $C_5H_{11}$ | —OCO | 40–122 |
| 7 | $C_8H_{17}$ | — | Cl | — | — | $OCOOC_3H_7$ | —OCO | 58–141 |
| 8 | $C_3H_7$ | — | Cl | — | — | $CH_2CH(CH_3)C_2H_5$ | —OCO | 35–92 |
| 9 | $C_4H_9$ | — | Cl | — | — | $CH_2CH(CH_3)C_2H_5$ | —OCO | 40–86 |
| 10 | $C_5H_{11}$ | — | Cl | — | — | $CH_2CH(CH_3)C_2H_5$ | —OCO | 47–95 |
| 11 | $C_5H_{11}$ | — | — | Cl | — | $CH_2CH(CH_3)C_2H_5$ | —OCO | 68–102 |
| 12 | $C_8H_{17}$ | — | Cl | — | — | $CH_2CH(CH_3)C_2H_5$ | —OCO | 36–83 |
| 13 | $CH_2CH(CH_3)C_2H_5$ | — | — | Cl | — | $CH_2CH(CH_3)C_2H_5$ | —COO— | 95–107 |
| 14 | $CH_2CH(CH_3)C_2H_5$ | — | — | $CH_3$ | — | $CH_2CH(CH_3)C_2H_5$ | —COO— | 69–92 |
| 15 | Cl | Cl | — | — | — | $OC_5H_{11}$ | —OCO | 113–184 |
| 16 | $C_8H_{17}$ | — | Cl | — | — | $C_7H_{15}$ | —OCO | 39–105 |
| 17 | $C_8H_{17}$ | — | — | Cl | — | $C_7H_{15}$ | —OCO | 70–106 |
| 18 | CN | — | Cl | — | — | $C_7H_{15}$ | —OCO | 69–160 |
| 19 | $C_8H_{17}$ | — | Cl | — | — | CN | —OCO | 96–167 |
| 20 | $C_6H_{13}$ | — | Cl | — | — | $C_3H_7$ | —OCO | 48–120 |
| 21 | $C_6H_{13}$ | — | Cl | — | — | $C_4H_9$ | —OCO | 48–110 |
| 22 | $C_6H_{13}$ | — | Cl | — | — | $C_5H_{11}$ | —OCO | 35–114 |
| 23 | $C_6H_{13}$ | — | Cl | — | — | $C_6H_{13}$ | —OCO | 39–105 |
| 24 | $C_6H_{13}$ | — | Cl | — | — | $C_7H_{15}$ | —OCO | 47–107 |
| 25 | $C_6H_{13}$ | — | Cl | — | — | $C_8H_{17}$ | —OCO | 39–102 |
| 26 | $C_5H_{11}$ | — | — | Cl | — | $C_3H_7$ | —OCO | 75–133 |
| 27 | $C_5H_{11}$ | — | — | Cl | — | $C_4H_9$ | —OCO | 76–123 |
| 28 | $C_5H_{11}$ | — | — | Cl | — | $C_6H_{13}$ | —OCO | 57–117 |
| 29 | $C_5H_{11}$ | — | — | Cl | — | $C_7H_{15}$ | —OCO | 55–119 |
| 30 | $C_5H_{11}$ | — | — | Cl | — | $C_8H_{17}$ | —OCO | 63–112 |
| 31 | $C_5H_{11}$ | — | Cl | — | — | $C_3H_7$ | —OCO | 57–131 |
| 32 | $C_5H_{11}$ | — | Cl | — | — | $C_4H_9$ | —OCO | 41–118 |
| 33 | $C_5H_{11}$ | — | Cl | — | — | $C_6H_{13}$ | —OCO | 38–114 |
| 34 | $C_5H_{11}$ | — | Cl | — | — | $C_7H_{15}$ | —OCO | 45–114 |
| 35 | $C_5H_{11}$ | — | Cl | — | — | $C_8H_{17}$ | —OCO | 42–109 |
| 36 | $C_5H_{11}$ | — | Cl | — | — | $C_6H_5$ | —OCO | 100–223 |
| 37 | $C_8H_{17}O$ | — | Cl | — | — | $CH_2CH(CH_3)C_2H_5$ | —OCO | 63–110 |
| 38 | $C_8H_{17}$ | — | — | Cl | — | $CH_2CH(CH_3)C_2H_5$ | —OCO | 70–86 |

The present invention, by virtue of its ability of addressing two states of orientation allows for improvement in multiplexing (or matrix addressing) of field effect devices. Multiplexing can be accomplished using a cell configuration generally similar to that of FIG. 2 only walls 10 and 11 have thereon conductive strips with the strips of one wall being arranged orthogonal to those of the other wall to form an x-y grid. Each strip has a separate electrical connection to a voltage source. In this manner, a cross-conductor, addressable cell is formed which allows one to selectively apply a field to any desired portion of the grid. A liquid crystal material is better suited for multiplexing applications the smaller the difference $V_m = V_{on} - V_{th}$, where $V_{th}$ is the threshold voltage for the reorientation and $V_{on}$ the voltage required for the desired contrast of the device. Normally, liquid crystal materials feature a $V_m > V_{th}$ and multiplexing in field effect devices cannot easily be obtained. Materials with a low frequency dielectric loss, as described and defined above, offer a remedy to this situation. Superimposing a voltage U having a frequency such that $\Delta\epsilon < 0$, increases the threshold voltage to a higher $V_{th}'$ according to the relation $$(V_{th}')^2 = V_{th}^2 + \frac{|\Delta\epsilon_1|}{|\Delta\epsilon_2|} \mu^2$$

where $\Delta\epsilon_1$ is the anisotropy at the biasing frequency, and $\Delta\epsilon_2$ the anisotropy at the unbiased frequency. Although increasing U also increases $V_{on}$ to $V_{on}'$, the new voltage difference $v_m'$ decreases as $V_{on}' - V_{th}' \sim 1/V_{th}'$. Examples 2 demonstrates how this method results in a $V_m' << V_{th}$.

For a further discussion of the appearance and texture of liquid crystals in general, see G. H. Brown, J. W. Doane and V. D. Neff, *A Review of Structures and physical Properties of Liquid Crystals*, CRC Press, 1971, incorporated herein by reference.

The following examples are included for a further understanding of the invention.

EXAMPLE 1

A cell having the structure similar to that illustrated in FIG. 2 is prepared as follows. Two glass plates 10 and 11 bearing thin, transparent, conductive, tin oxide coatings 12 and 13, respectively, are mounted as transparent electrodes separated by two 5–15µ m thick spacer strips of poly(ethylene terephthalate). The central volume between the transparent electrodes is filled with the liquid crystal 4-pentylphenyl 4-(4-pentylbenzoyloxy)-3-chlorobenzoate which is maintained in the mesomorphic state. A voltage source 15 supplying 130 Vpp alternating every 5 msec. between 1 kHz and 10 kHz is applied to the transparent electrodes. Turbidity is observed in the element for both transmitted and reflected light as a result of dielectric reorientation by the changing frequency of the applied AC voltage. The transmission of light incident normal to the transparent electrodes decreases to about 2% (maximum turbidity) during the application of the 10 kHz and relaxes to about 25% during the application of the 1 kHz burst. The element is clarified by applying a constant frequency, conveniently 10 kHz, for about 50 msec. Either the high frequency or low frequency voltage can be used to clarify the element, as is preferred. The light-scattering observed is a transient phenomenon or relatively short response time, occurring only when the frequency is changed. For this liquid crystal material, at a temperature of 55° C, $\epsilon_{\parallel} > \epsilon_{\perp}$ at 1 kHz, but $\epsilon_{\parallel} < \epsilon_{\perp}$ at 10 kHz. A dielectric loss with increasing frequency of the applied AC potential is exhibited by $\epsilon_{\parallel}$, whereas $\epsilon_{\perp}$ shows no appreciable change at either frequency. Upon application of an external electric field of 1 kHz, the molecules tend to align parallel to the electric field because $\epsilon_{\parallel} > \epsilon_{\perp}$. Upon changing the frequency of the applied field to 10 kHz, the molecules realign perpendicular to the electric field because now $\epsilon_{\perp} > \epsilon_{\parallel}$. The force for reorientation excited by the applied electric field is directly proportional to the dielectric anisotropy, $\Delta\epsilon = (\epsilon_{\parallel} - \epsilon_{\perp})$. Thus, rapid changing of the frequency causes rapid movement of the molecules resulting in dielectric scattering.

Other liquid crystals which have been found to operate in the above process at 10 kHz when in the mesomorphic form include the following compounds and mixtures thereof:

| Compound No. From Table I | Structure | Name |
|---|---|---|
| 1 | $C_8H_{17}O-\text{C}_6H_4-OC(O)-C_6H_3(Cl)-OC(O)-C_6H_4-OC_8H_{17}$ | 4-Octyloxyphenyl 3-chloro-4-(4-octyloxybenzoyloxy)benzoate |
| 2 | $C_8H_{17}O-\text{C}_6H_4-OC(O)-C_6H_3(Cl)-OC(O)-C_6H_4-C_5H_{11}$ | 4-Octyloxyphenyl 4-(4-pentylbenzoyloxy)-3-chlorobenzoate |
| 3 | $C_5H_{11}-\text{C}_6H_4-OC(O)-C_6H_3(Cl)-OC(O)-C_6H_4-C_5H_{11}$ | 4-Pentylphenyl 4-(4-pentylbenzoyloxy)-3-chlorobenzoate |

| Compound No. From Table I | Structure | Name |
|---|---|---|
| 4 | C$_8$H$_{17}$—⬡—OC(=O)—⬡(Cl)—OC(=O)—⬡—OC(=O)—C$_4$H$_9$ | 4-Octylphenyl 2-chloro-4-(4-pentanoyloxybenzoyloxy)benzoate |
| 5 | C$_8$H$_{17}$—⬡—OC(=O)—⬡(Cl)—OC(=O)—⬡(Cl)—O—C(=O)—C$_4$H$_9$ | 4-Octylphenyl 2-chloro-4-(3-chloro-4-pentanoyloxybenzoyloxy)-benzoate |
| 6 | C$_5$H$_{11}$—⬡—OC(=O)—⬡(Cl)—OC(=O)—⬡—C$_5$H$_{11}$ | 4-Pentylphenyl 4-(4-pentylbenzoyloxy)-2-chlorobenzoate |
| 7 | C$_8$H$_{17}$—⬡—OC(=O)—⬡(Cl)—OC(=O)—⬡—OCO—C$_3$H$_7$ | 4-Octylphenyl 2-chloro-4-(4-propoxycarbonyloxybenzyloxy)-benzoate |

EXAMPLE 2

A liquid crystal mixture comprising equal parts by weight of liquid crystals having the following structures is prepared:

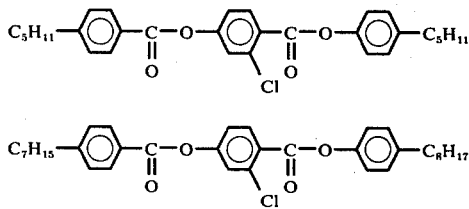

The dielectric constants for this mixture measured at 500 Hz and 10 kHz are as follows:

| At 500 Hz | At 10 kHz |
|---|---|
| $\epsilon_\parallel = 12.5$ | $\epsilon_\parallel = 4.5$ |
| $\epsilon_\perp = 6.5$ | $\epsilon_\perp = 6.5$ |
| $\Delta\epsilon_1 = 6$ | $\Delta\epsilon_2 = -2$ |

The critical or crossover frequency ($f_c$), at which $\Delta\epsilon=0$, is about 4 kHz. A cell, similar to that of FIG. 4, with walls 10 and 11 spaced 12 $\mu$m apart is filled with the above mixture which is a nematic fluid at room temperature. Prior to filling the interior cell walls were rubbed with a cotton ball in mutually perpendicular directions. As a result of this rubbing, the liquid crystal material assumes a "twisted nematic" texture as described previously. The cell is brought between a pair of crossed polarizers 17 and 18 so that the polarizing direction of the polarizer 17 is parallel to the direction of rubbing of the adjacent cell wall 11 and polarizer 18 is parallel to the direction of rubbing of wall 10. The transmission of this arrangement is maximal without an applied voltage.

As an example of how the present invention can improve multiplexed addressing in the manner described above, the following two cases should be compared. Upon applying a voltage of frequency $f$ which is below the crossover frequency $f_c$, no decrease in transmission is observed until the applied voltage reaches a threshold voltage $V_{th}$. The observed $V_{th}$ for $f=100$ Hz is about $2V_{RMS}$. The ratio of transmission with voltage to transmission without voltage is designated the contrast ratio. Defining the ON state as having a contrast ratio of 1:10, then for a 100 Hz voltage one observes an ON voltage $V_{ON}=6.75V_{RMS}$ (Case A). The threshold voltage of Case A, $V_{th}$, can be increased to $V_{th}'$ by biasing simultaneously to the low frequency ($f<f_c$) voltage a high frequency ($f>f_c$) voltage, U (Case B). For example, applying a 10 kHz voltage $U=10V_{RMS}$, increases the 100 Hz voltage from $V_{th}=2V_{RMS}$ to $V_{th}' = 5.75V_{RMS}$. Likewise, the ON voltage increases from $V_{ON} = 6.75V_{RMS}$ to $V_{ON}' = 8V_{RMS}$. Multiplexing requires that $(V_{ON}-V_{th})<V_{th}$. It is evident that while multiplexing is difficult, if not impossible for Case A, it is clearly possible for Case B in that the following is true:

Case A: 100 Hz voltages (no bias) for contrast ratio 1:10 ("on" state):

$V_{on}=6.75$ $V_{on}-V_{th}=4.75V>V_{th}$ $V_{th}=2V$

Case B: 100 Hz voltages (10 kHz bias) for contrast ratio 1:10 ("on" state):

$V_{on}=8.0V$ $V_{on}-V_{th}=2.25V<V_{th}$ $V_{th}=5.75$

Figure 5:
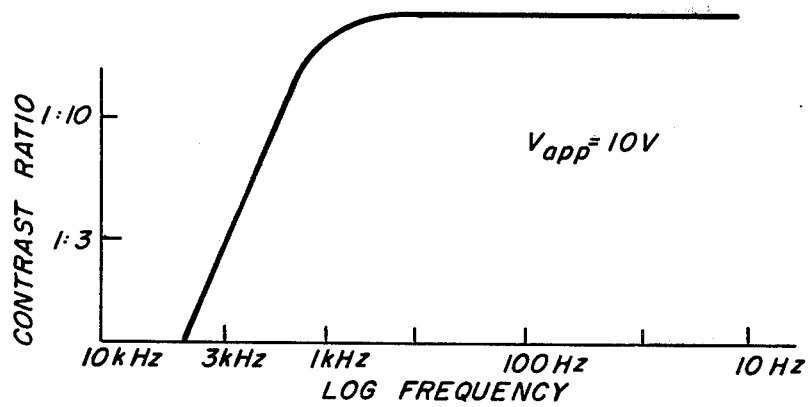
FIG. 5 is a graph showing contrast ratio as a function of decreasing frequency.

This is an important result because liquid crystals without a low frequency dielectric loss do not allow for such a scheme. In principle, all liquid crystals have dielectric loss in the sense employed here; however, the crossover frequency is larger than about 100 kHz and, therefore, is beyond the practical or useful realm. The same device is now addressed by changing the frequency of the applied voltage. The amplitude is chosen to be $10V_{RMS}$. The contrast ratio as a function of decreasing frequency is depicted in FIG. 5 of the drawings: Above 5 kHz, $\Delta\epsilon<0$ and the twisted texture is stabilized. Below 5 kHz, $\Delta\epsilon > 0$ and the material orients homeotropic. Changing the frequency and keeping the amplitude of the applied voltage constant has the advantage that a driving force is present, when switching from one state to another. This decreases the decay time.

EXAMPLE 3

A liquid crystal mixture is prepared from equal parts of the following compounds.

Figure 6:
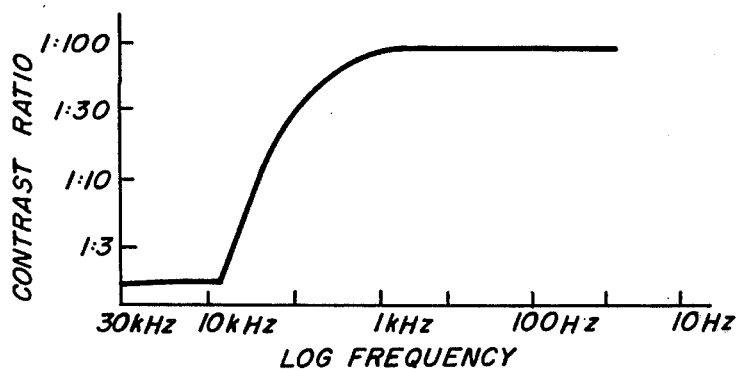
FIG. 6 is a graph showing change in contrast ratio at about 600 nm versus change in frequency at a contrast amplitude of $60V_{RMS}$.

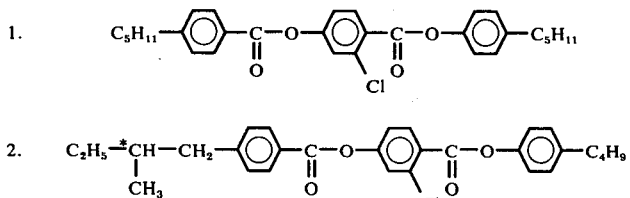

to give a cholesteric (chiral nematic) material with a maximum of reflection at $\lambda \approx 600$ nm. Other colors are possible, depending on the mixing ratio of the optically active (Compound No. 2 in which the asterisk indicates the active carbon) and non-optically active component (Compound No. 1). It shows the same behavior of dielectric loss as the mixture of Example 2. A cell as shown schematically in FIG. 2 and having a spacing of 6.5 $\mu$m is filled with the above mixture and the reflection of the cell for incident light of 600 nm. The incident light and the reflected light are passed through a circular polarizer of the correct sign to suppress background reflection from the cell walls. Upon applying an electric field of $9.5 \times 10^4$ V/cm (60 $V_{RMS}$ across ¼ mil cell spacing) at a frequency of 10 kHz, the cell content assumes the planar texture and reflects light in the region of 600 nm. Upon removing the applied voltage, the liquid crystal material remains in the planar texture and the reflection decreases only slightly with time. Application of $9.5 \times 10^4$ V/cm at 100 Hz destroys the planar texture and forces the material into a homeotropic alignment of the nematic texture. The reflection decreases almost to zero. Removing the applied voltage, the reflection increases only slightly in time. The thermal relaxation process to re-establish the planar texture is weak and negligible. The change in contrast ratio at about 600 nm. (i.e., Reflection — on/Reflection — off) versus change in frequency at a contrast amplitude of 60 $V_{RMS}$ is shown in FIG. 6 of the drawings: As seen in FIG. 6 and as mentioned previously, the use of a material having a dielectric loss between 100 Hz and 10 kHz provides for the possibility of electrical switching between two different states (planar, cholesteric colored looking at 10 kHz; homeotropic nematic, black looking at 100 Hz), which is otherwise not possible, since internal relaxation process in cholesteric phase are so weak that the liquid crystal material never returns to the texture of initial order.

The optically active compound of Example 3 can be prepared by (1) reaction of the optically active alcohol 2-methylbutyl alcohol with p-toluenesulfonyl chloride, (2) the product of (1) is reacted with a phenyl Grinard reagent, (3) the resultant product of (2) is then acetylated, (4) followed by oxidation of the product of (3) using potassium hypochlorite as the oxidizing agent, (5) next the product of (4) is converted to the acid chloride which, in turn, is reacted with the appropriate alcohol to form the optically active liquid crystal.

The invention has been described in detail with particular reference to certain preferred embodiments thereof, but it will be understood that variations and modifications can be effected within the spirit and scope of the invention.

We claim:
1. A method of scattering incident light comprising the steps of:
    1. illuminating a liquid crystalline composition
        a. having a positive, zero frequency dielectric anisotropy,
        b. exhibiting a dielectric loss in the component of permittivity parallel to the optic axis of said composition, and
        c. exhibiting a dielectric anisotropy inversion when subjected to an electric field greater than the crossover frequency at which the dielectric anisotropy is zero;
    2. alternately at a rate of change faster than about 20 changes per second subjected said composition to
        a. an electric field of a first frequency within the audio range below said crossover frequency, and
        b. an electric field of a second frequency within the audio range above said crossover frequency to provide transient molecular reorientation of said composition thereby scattering incident light.
2. The method as described in claim 1 wherein said crossover frequency is between 500 Hz and 10 kHz.
3. The method as described in claim 1 wherein said first frequency is about 0.5 to 0.1 times the crossover frequency.
4. The method as described in claim 1 wherein said second frequency is about 2 to 10 times the crossover frequency.
5. A method of modulating light comprising the steps of:
    1. illuminating an electro-optical device comprising:
        a. two closely-spaced, transparent, parallel conductive walls containing therebetween
        b. a cholesteric liquid crystalline composition
            i. having a positive, zero frequency dielectric anisotropy,
            ii. exhibiting a dielectric loss in $\epsilon_\parallel$,
            iii. exhibiting a dielectric anisotropy inversion when subjected to an electric field of a frequency greater than the crossover frequency at which the dielectric anisotropy is 0, and
            iv. having a planar cholesteric texture when no field is applied,
    2. applying to said composition an electric field of a first frequency within the audio range below said crossover frequency and of a magnitude sufficient to alter the texture of said composition to a homeotropic nematic texture; and
    3. applying an electric field of a second frequency within the audio range above said crossover fre- quency to orient said composition in a planar cholesteric texture.

6. The method as described in claim 5 wherein said crossover frequency is between about 500 Hz to 10 kHz.

7. The method as described in claim 5 wherein said liquid crystalline composition is mesomorphic within the temperature range of about −20° to 100° C.

8. The method as described in claim 5 wherein said device is illuminated on one side and has a light absorbing layer on the side opposite that of illumination.

9. The method as described in claim 5 wherein said first frequency is about 0.5 to 0.1 times the crossover frequency.

10. The method as described in claim 5 wherein said second frequency is about 2 to 10 times the crossover frequency.

11. The method as described in claim 5 wherein said cholesteric composition comprises a chiral nematic material.

* * * * *

UNITED STATES PATENT AND TRADEMARK OFFICE
CERTIFICATE OF CORRECTION

PATENT NO. : 4,009,934

DATED : March 1, 1977

INVENTOR(S) : Robert M. Goodwin, Richard T. Klingbiel and Hermann K. Bucher

It is certified that error appears in the above-identified patent and that said Letters Patent are hereby corrected as shown below:

On the title page, correct the spelling of the attorney's name from "Chamin" to -- Chapin --.

Column 1, line 63, delete "subjecting" and insert --been--.

Column 7, line 29, delete "3n";

line 33, after "dielectric" insert --anisotropy--

Column 16, line 32, change "subjected" to --subjecting--.

Signed and Sealed this

Twenty-fifth Day of July 1978

[SEAL]

Attest:

RUTH C. MASON
Attesting Officer

DONALD W. BANNER
Commissioner of Patents and Trademarks